United States Patent [19]
Coon et al.

[11] 3,980,254
[45] Sept. 14, 1976

[54] FILM STRIP LEADER ALIGNMENT AID

[75] Inventors: Donald B. Coon, Chesterland, Ohio; Timothy M. Katanik, College Park, Md.

[73] Assignee: Western Reserve Electronics, Inc., Twinsburg, Ohio

[22] Filed: Apr. 3, 1975

[21] Appl. No.: 564,702

[52] U.S. Cl. ............................. 242/195; 242/197; 352/78 R; 352/235; 352/237
[51] Int. Cl.² ..................... G03B 1/04; G11B 15/32
[58] Field of Search ......................... 242/195–199, 242/71.1, 107.2; 226/91, 92; 352/157, 158, 72, 78 R, 235, 236, 237, 241

[56] References Cited
UNITED STATES PATENTS

| | | | |
|---|---|---|---|
| 559,022 | 4/1896 | Barnes | 242/107.2 |
| 1,205,367 | 11/1916 | MacBride | 352/238 |
| 2,615,648 | 10/1952 | Carlson | 242/107.6 |
| 3,190,575 | 6/1965 | Hayner et al. | 242/195 |
| 3,297,398 | 1/1967 | Donofrio | 352/232 |
| 3,690,582 | 9/1972 | Duvall | 242/71.1 |
| 3,809,218 | 5/1974 | Furst | 242/195 |

*Primary Examiner*—Leonard D. Christian

[57] ABSTRACT

The disclosure relates to an improved means for assuring the proper alignment of the leader on the end of a film strip for a roll of film disposed in a cartridge, whereby, when the cartridge is placed in a viewing or reproducing machine, the end of the strip will be properly picked up and threaded into the machine, wherein the strip has a friction portion that engages with the exit or entrance throat of the cartridge and an indicator on the strip to show when the film is pulled out to the proper position for threading into a machine.

8 Claims, 4 Drawing Figures

FILM STRIP LEADER ALIGNMENT AID

BACKGROUND OF THE INVENTION

1. Field of the Invention

The invention relates to film cassettes or cartridge leaders for microfilm and particularly to a means whereby the leader strip that projects from the throat on the cassette can be pulled out the proper distance to cause it to self-thread automatically into a microfilm reader or printer.

2. Description of the Prior Art

It is common practice to provide cartridges, cassettes or magazines which contain a roll of microfilm, the most common being 16 mm., wherein the cassette is placed in a reader or reader-printer and the leader strip is supposed to be picked up by the mechanism of the machine and automatically moved into position whereby the frames on the film can be separately viewed by moving the film through the machine.

One of the problems has been that the end of the film is not properly positioned to be engaged by the mechanism of the machine to cause the film to be automatically threaded.

Various types of leaders have been proposed, such as that of U.S. Pat. No. 3,655,145, where the leader has a widened portion to prevent it from disappearing into the cartridge when the film is rewound and an open window to enable it to be picked up.

Some of them use spade-shaped ends for the same purpose, such as shown in U.S. Pat. No. 3,379,387.

More recently it has become the practice to provide a leader, the same width as the film with a plastic button inserted through the film leader, near the end, to provide a plug or slug integral with the film which projects from each side thereof that prevents the film from being entirely retracted into the housing and can also be used to engage with the reader leader pickup mechanism to draw the film into and automatically thread it into the reader or reader-printer. Thus the film may be rewound until the button engages with the throat of the film container and does not project beyond the guide to the throat enabling the cassette to be more conveniently stored in a suitable file.

When it is desired to use the film, the end of the leader at the button is pulled outward a certain distance and then the cassette placed in a receptacle on the reader or reader-printer where it is picked up by the mechanism of the machine.

The problem has been to pull the leader out to exactly the right distance to enable it to be picked up.

SUMMARY OF THE INVENTION

The invention consists of placing an indicator on the film leader inwardly of the button so that the film may be pulled out to the exact distance indicated by the indicator and providing a thickened part on the leader that frictionally engages with the walls of the throat to hold the leader in the desired "pulled out" position while it is being placed in the receptacle on the reader-printer and holds it in that position where it will be more readily picked up by the reader-printer mechanism.

DESCRIPTION OF THE PREFERRED EMBODIMENTS

Figure 1:
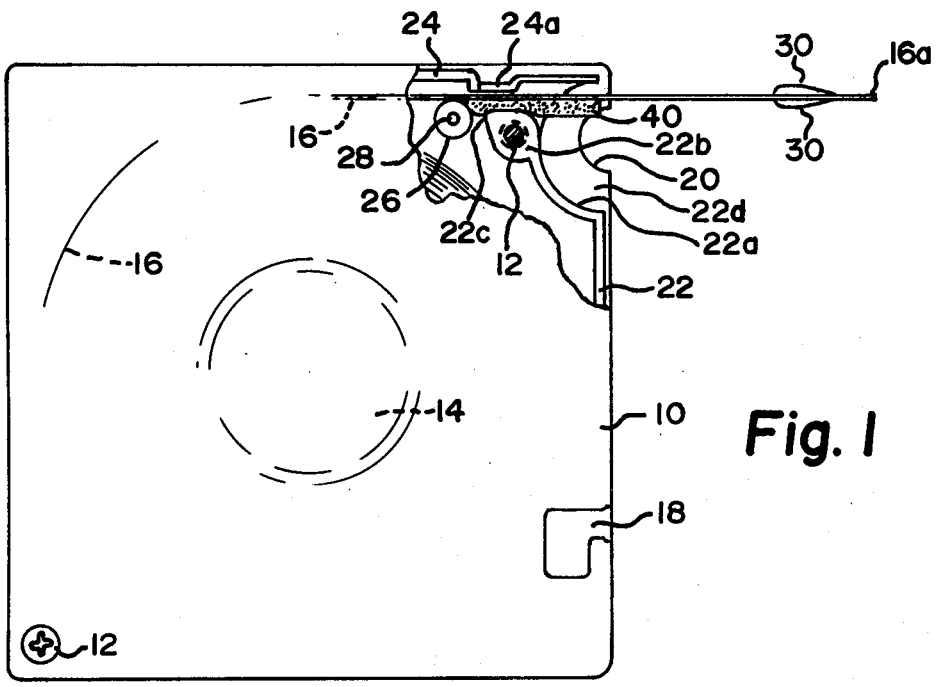
FIG. 1 is a side elevational view of a cassette, with the one wall broken away at the throat and showing a leader strip withdrawn to the proper distance.

FIG. 1 is a side elevational view of a cassette of a type commonly made by Eastman Kodak Company, Part No. 101-2780. Basically it is composed of plastic having flanged side walls such as 10 which are held together by screws such as 12 which support a revolvable core 14 between the side walls about which a film strip 16 is disposed. The cassette is provided with suitable depressions 18 and notches 20 which engage with suitable projections on the reader-printer to properly position the same when it is placed in the receiver.

At the upper right-hand corner of the cassette the flanges, which separate the two sides, are formed to provide an exit and entrance throat for the film strip. To this end the flanges 22 curve at 22a to provide a semi-circular wall concentric with the notch 20. At 22b the flanges are provided with bosses which define one side of the film guiding throat. The bosses are generally pear-shaped with the apeces 22c pointing inward toward the interior of the cassette. One of the bosses 22b is threaded and a screw 12 is used to hold the two cassette halves together.

The upper flanges 24 are provided with offset parts 24a that project toward the bosses 22b and define the throat through which the film may pass. Inwardly of the throat at the inward entrance, an antifriction roller 26 is supported between the walls 10 on a pin 28.

The parts described are of a commercial cassette well known in the art. Suffice to say they form a throat through which the film strip may freely pass with a minimum of friction or drag on the film. The throat described is necessarily large to provide ample clearance for the film without undue abrasion or scratching of the film which passes therethrough. In addition, it allows the film to be withdrawn or rewound with a minimum of force, thus enabling the film to be withdrawn or rewound at high speed. Ordinarily the core 14 is provided with a magnetically attractive disc or notches for engagement with the reader-printer mechanism for rewinding purposes.

As stated, the film strip is attached to and wound around the core 14 and extends outward between the parts 22b and 24a which define the walls of the exit entrance throat into the curved outer recess 22d.

The film strip 16 near its outer end 16a is provided with a plastic protuberance or plug 30 made in two complementary parts which are inserted through suitable apertures in the film and heat sealed to hold them together to provide generally triangular projections on opposite sides of the film. These projections are sufficiently thick that they cannot pass through the throat and have a corrugated surface enabling a frictional engagement with the fingers. Ordinarily when the film is rewound the widened butt end 30a of the protuberances engage with the outer entrance to the throat and with the outermost end of the film 16a sufficiently short that it does not extend beyond the confines of the side walls 10, thus presenting a neat appearance and preventing interference of the end of the film with the storage facilities.

The problem has been that the film must be partially pulled out of the cassette so that the plug and/or an aperture 16b will be in the proper position to be picked up automatically by the self-threading mechanism of the reader-printer. Best results are obtained if the strip is pulled out a predetermined distance. Previously the film was pulled out too far or not far enough.

The above is also complicated by the fact that the resiliency of the film is such that once pulled out it is apt to retract after release by the fingers or due to vibration, not leaving enough projecting outwardly or with too much projecting outward.

Figure 2:
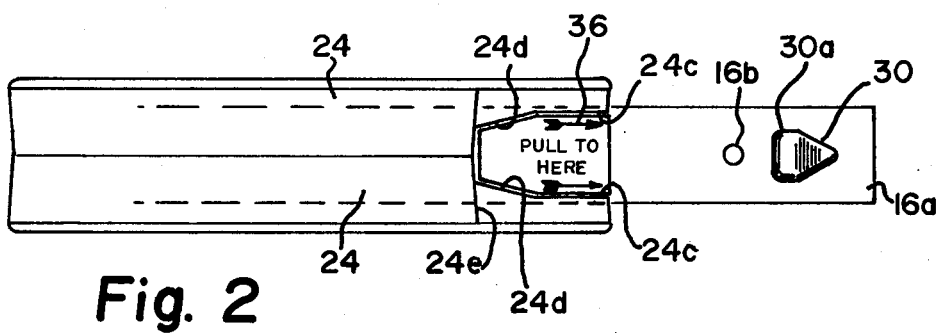
FIG. 2 is a top plan view of the cassette with the leader strip extended.

Two expedients are used to maintain the exact pulled out position. The first is an indicator means in the form of a piece of material secured to the upper side of the film (FIG. 2) which is preferably shaped to the same contour as the contour defined by the upper flanges 24. As can be seen from the drawing, at the outer ends 24c the edges of the flanges are substantially parallel and then converge toward each other at 24d, and end at a transverse wall 24e, leaving a window-like opening as indicated. The material of the indicator has arrows 36 and the notation between them of "PULL TO HERE". When the film is pulled out so that the points of the arrows register with forward edges of the flanges 24 it is at the exact distance to be properly subsequently picked up.

The other expedient is to hold the film in the proper pulled out position so that it will not come out too far or retract for the reasons stated. When the film is completely retracted the indicator is inside the cassette. To maintain it in position in the throat when it is pulled out so that the indicator shows in the window, one side of the film is provided with a thickened surface which has frictional engagement with the flange parts 24a and 22b defining the throat.

The preferred means for thickening the film is by securing a foam pad 40 to one side of the film, preferably the bottom side as shown in FIG. 1. The pad can be of polyurethane, foam rubber, felt or any other highly compressible resilient material. By placing it on the underside of the film it is not apt to be separated from the film because there are no knife-like surfaces on the throat to engage the film or the pad of material and scrape it off. It is also pointed out that the apparent thickness of the film could be obtained by forming concavo-convex indentations in the film at a zone of approximately the same size and shape by the use of heated dies. The pad could also be formed by flocking.

Preferably the means noted above is packaged in a kit where the indicator is an adhesive-backed piece of material having a protective paper that may be peeled off and the indicator stuck to the film the proper distance from the extreme outer end, which may be 1¾ inches. Likewise the pad of foam material is also adhesively backed and protected by a piece of paper that may be pulled off to expose the adhesive.

In any event, when the film is pulled out to the place indicated as shown in the drawings, the foam material is thicker than the gap in the throat and is therefore compressed between the parts 22b and 24a, as shown in FIG. 1, and the film is retained in the exact position desired.

It will be apparent that once the film is inserted in the reader-printer, the thickened portion once pulled beyond the throat presents no interference with the subsequent movement of the film.

Although it has been proposed to line the throat of some types of cassettes with a material such as felt or flocking, these are undesirable because they pick up foreign material such as dust which gradually cakes and eventually scratches the film. In the present instance, when the cassette is not being used, the foam material is inside the cassette where it cannot collect dust.

Figure 3:
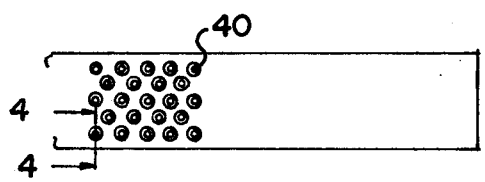
FIG. 3 is a fragmentary plan view of the end of a leader with a modified form of the invention.
Figure 4:
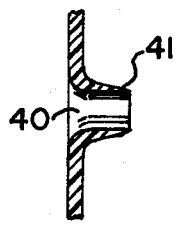
FIG. 4 is a section on the line 4—4 of FIG. 3.

As pointed out, the film could be provided with a friction surface by deforming the material. FIGS. 3 and 4 show an end of the film with a plurality of portions 40 formed by pressing a heated die against the film to displace the film toward the under side. In effect, this displaces the material to form highly flexible projections 41.

We claim:

1. A film positioning means for a film cartridge having a film therein and wherein the cartridge has at least a pair of spaced apart walls defining an exit and entrance throat opening for the passage of the film, the improvement which comprises resilient friction means on the film for increasing the apparent thickness of the film in a zone spaced from the end of the film the right distance to allow the end of the film to be engaged by a reader-printer, said means being thick enough to frictionally and resiliently engage with opposite inner walls of the throat and increase the drag on the film in either direction and position it in the desired extended position but still allow it to pass through.

2. A film positioning means as described in claim 1 wherein said zone is formed by a piece of soft resilient material secured to the side of the film.

3. A film positioning means as described in claim 2 wherein said material is secured to one side of the film.

4. A film positioning means as described in claim 3, wherein the material is polyurethane.

5. A film positioning means as described in claim 3 wherein said material is soft felt.

6. A film positioning means as described in claim 1 wherein the material of the film is displaced to provide highly flexible thickened portions.

7. A film positioning means as described in claim 1 wherein a visible indicator is disposed on one side of the film to indicate the position to which the film is initially pulled out.

8. A film positioning means as described in claim 7 wherein said indicator is opposite to said thickened zone.

* * * * *